US012643684B2

(12) United States Patent
Belieres Montero

(10) Patent No.: US 12,643,684 B2
(45) Date of Patent: Jun. 2, 2026

(54) METHOD OF SPACE TRANSPORTATION USING A DISTRIBUTED NETWORK OF SPACE TUGS

(71) Applicant: MONTERO USA INCORPORATED, Los Altos Hills, CA (US)

(72) Inventor: Ignacio Alejandro Belieres Montero, Buenos Aires (AR)

(73) Assignee: MONTERO USA INCORPORATED, Los Altos Hills, CA (US)

( * ) Notice: Subject to any disclaimer, the term of this patent is extended or adjusted under 35 U.S.C. 154(b) by 0 days.

(21) Appl. No.: 19/022,315

(22) Filed: Jan. 15, 2025

(65) Prior Publication Data

US 2025/0153869 A1     May 15, 2025

Related U.S. Application Data

(63) Continuation of application No. 17/006,880, filed on Aug. 30, 2020, now Pat. No. 12,202,627.

(60) Provisional application No. 62/894,608, filed on Aug. 30, 2019.

(51) Int. Cl.

| | |
|---|---|
| *B64G 1/24* | (2006.01) |
| *B64G 1/00* | (2006.01) |
| *B64G 1/10* | (2006.01) |
| *B64G 1/64* | (2006.01) |
| *B64G 4/00* | (2006.01) |

(52) U.S. Cl.
CPC ........... *B64G 1/2427* (2023.08); *B64G 1/002* (2013.01); *B64G 1/1078* (2013.01); *B64G 1/242* (2013.01); *B64G 1/646* (2013.01);

*B64G 1/6462* (2023.08); *B64G 4/00* (2013.01); *B64G 1/1081* (2023.08); *B64G 2004/005* (2013.01)

(58) Field of Classification Search
CPC ........ B64G 1/002; B64G 1/007; B64G 1/242; B64G 1/646; B64G 4/00; B64G 2004/005
USPC ...................................................... 244/158.5
See application file for complete search history.

(56) References Cited

U.S. PATENT DOCUMENTS

| | | | |
|---|---|---|---|
| 5,299,764 | A | 4/1994 | Scott |
| 5,511,748 | A | 4/1996 | Scott |
| 6,364,252 | B1 | 4/2002 | Anderman |
| 6,464,174 | B1 | 10/2002 | Turner |
| 2002/0130222 | A1 | 9/2002 | Anderman |
| 2003/0029969 | A1 | 2/2003 | Turner |
| 2006/0278765 | A1 | 12/2006 | Strack et al. |
| 2007/0040067 | A1 | 2/2007 | D'Ausilio et al. |
| 2020/0223568 | A1 | 7/2020 | Nicholson et al. |
| 2021/0300597 | A1 | 9/2021 | Clark |

*Primary Examiner* — Brady W Frazier
(74) *Attorney, Agent, or Firm* — Cognition IP, P.C.; Edward Steakley

(57) ABSTRACT

Disclosed are systems and methods for a distributed space transportation network. Satellite launches to orbit are more efficiently performed by large rockets. Modern satellites are in smaller form factor, leaving the large launch rockets with excess capacity. Small satellite operators can use rideshares, but do not have efficient options for delivering their satellites to their desired destination and may be forced to operate their satellites in compromise orbits. The disclosed distributed space transportation network maintains a fleet of space tugs, which can dock with satellites in space at an initial arrival destination and transport the satellites to their final destinations. In one embodiment, the space tugs can dock with satellite depots to obtain fuel and repairs.

20 Claims, 9 Drawing Sheets

34

Start

Receive input data for propagating trajectory

Receive a propagation time parameter

Propagate the spacecraft's trajectory

Output the propagated trajectory and flight parameters

End

36

Start

Receive input data including current state of space tug and customer satellite

Recall physics layer to determine a rendezvous position

Generate a set of orbital maneuvers to rendezvous node A to node B

37

Output optimal or near optimal set of maneuvers

39

End

METHOD OF SPACE TRANSPORTATION USING A DISTRIBUTED NETWORK OF SPACE TUGS

CROSS-REFERENCE TO RELATED APPLICATIONS

This application is a continuation of U.S. patent application Ser. No. 17/006,880, filed on Aug. 30, 2020, which claims the benefit of U.S. Provisional Patent Application No. 62/894,608, filed on Aug. 30, 2019, which are all hereby incorporated by reference in their entirety.

BACKGROUND

Field of the Invention

This invention relates generally to the field of spacecraft launches into space, and in particular, to efficient transportation of small satellites in space.

Description of the Related Art

Satellites play an important role in modern life. They provide many of the tools we enjoy. Earth observation, weather prediction, communication, scientific exploration, and military are among the fields in which satellites have made monumental contributions. Until now, most satellites were massive engineering undertakings and often were subsidized by governments or otherwise funded through substantial investments. As a result, satellite development and launch were time-consuming and capital-intensive efforts. Satellites were large objects, launched to space in large rockets.

Recent advances in electronics, coupled with advances in satellite technology have enabled development of efficient and smaller-sized satellites that can accomplish their tasks more efficiently and in a smaller form factor, compared to the satellites of the past. At the same time, more companies and satellite operators have developed satellites and have increased the demand for launch services for those satellites. While this is a welcome change, the increase in demand for satellite launches and smaller satellite form factors present the space industry with several challenges. First, launching smaller satellites to orbit is more technologically challenging and even more expensive than launching larger satellites using larger rockets, because larger rockets generally are better at breaking the earth's atmosphere and reaching orbit. Second, the performance of many modern satellites strongly correlates with their operation orbits. In other words, satellites operate more optimally in their intended orbits and less optimally in other orbits. For many modern satellites, optimal orbits lie in far-away distances, which are even more difficult to reach with smaller rockets with acceptable efficiency and reliability.

Rather than satellites being launched directly to their final destination, there is growing interest in last mile alternatives which entail an initial launch that sends an object to a first, initial orbit, where a last mile alternative is used to send the object to its final destination. A number of existing last mile solutions have arisen in space transportation. First, having onboard engines on the satellite provides the ability to move the satellite around after launch, but they are highly dependent on suppliers, extremely high cost, and many layers of added complexity are required. Second, a restartable last stage, or kick stage, can send the satellite to its final destination. A last part of the launch vehicle delivers the satellite into space, then uses extra fuel to move around and deorbit. The issue is that restartable last stages are inefficient, because the satellite must carry a significant amount of mass needed to bring the satellite into orbit, and they are not quickly amortized. Third, dedicated tugs are purpose-built for carrying the satellite to its final destination. However, they are hard to scale in terms of production capacity, and lead to a duplication of efforts because the satellite and spacecraft both require added hardware, e.g., two sets of avionics, two sets of guidance systems, and more. The added hardware also requires added mass, which is expensive.

Reusable space tugs could solve last mile problems in space. This would involve a space tug which stays in space and moves payloads based on manufacturing capacity. This leads to scalability, since there is the ability to quickly scale services and revenue with respect to launches. There is also less extra dry-mass launched per mission, which increases efficiency. There is also consolidation of fuel demand into fuel depots in space, leading to lowered cost that is paid to a launch provider, since it consolidates all costs for procuring fuel into a single place. A typical mission with reusable space tugs would involve the following steps: a payload is launched into initial orbit, where it will rendezvous with a tug which carries the payload to its final destination, then the tug will need to go to a fuel depot for refueling, then return to its parking orbit.

Reusable space tugs pose significant challenges, however. Complex logistics and mission planning are essential in order for operation. Fuel resupplies also need to be sent to the depot orbit regularly. Managing these events requires: coordination between depots and tugs, since they must not be too far away from each other; coordination between tugs and satellites, because tugs will need to be positioned to have the lowest cost and lowest response time possible; and coordination between all actors and the launch vehicles, in order to resupply depots, deploy the tugs, launch the satellites to initial orbit, and more. If all of this coordination were simply ad-hoc, there would be imperfect sharing of information and requirements. For example, depots would not be aware of where tugs are traveling to or what they need, satellite companies would not be aware of spacecraft locations and which launch vehicle will be best for them, and the end result would be an inefficient, opaque system. Depot companies would launch fuel to far away locations, space tug operators would burn more fuel per mission, and satellite companies would pay higher prices. There would be a cumbersome operations paradigm, a lack of value predictability for each actor, and operators would not have an accurate understanding of their costs.

In short, the existing methods of space access and transportation are unsustainable, each involving complex trade-offs between cost, time to market, long-term scalability, non-recurring expenses, and other undesirable trade-offs. For space access and transportation technology to scale on the order of thousands of satellites launched per year, there is a need for space transportation architectures and methods that can address these issues for reusable space tugs and other last mile alternatives. Specifically, there is a need in the field for a distributed in-space transportation network which allows for optimization along key parameters (e.g. basic access to space, minimal space time, minimal fuel expenditure, transport vehicle marginal depreciation costs, and more), and coordination between the various in-space objects and actors.

SUMMARY

In one aspect, a method of space transportation is disclosed. The method includes: launching a plurality of space tugs to orbits beyond earth's atmosphere; determining a flight mission, comprising a selection of one or more space tugs and a set of orbital maneuvers for a space tug from the selection to rendezvous with a satellite; maneuvering the space tug from the selection to the satellite based on the flight mission; and docking the space tug with the satellite; maneuvering the docked satellite to a destination in space, using the propulsion provided from the space tug.

In one embodiment, the flight mission further comprises one or more hand-offs of the satellite between the selection of one or more space tugs until the destination is reached.

In another embodiment, launching the plurality of space tugs, comprises using the excess capacity of rockets launching satellites to space, wherein those rocket launches are offered at cost or near cost to purchasers of those launches.

In one embodiment, the method further includes launching one or more satellite depots to orbits beyond earth's atmosphere, wherein the satellite depots are configured to store one or more of fuel, spare parts for space tugs and robotic capabilities to perform in-space repair for the space tugs.

In another embodiment, the flight mission further comprises a set of orbital maneuvers for one or more space tugs from the selection to rendezvous with one or more satellite depots to obtain fuel or robotic repairs.

In one embodiment, the space tugs are parked in LEO and the destination is in low earth orbit (LEO) zone, medium earth orbit (MEO) zone, geosynchronous (GEO) zone, or geostationary orbit (GSO) zone.

In some embodiments, determining a flight mission includes: estimating a trajectory of the satellite position after a period, comprising a propagation time parameter; receiving position and velocity data from one or more space tugs; selecting one or more space tugs to minimize a cost function; generate the set of orbital maneuvers from the selected space tugs to the satellite.

In another embodiment, determining a flight mission comprises selecting the one or more space tugs and the set of orbital maneuvers to minimize one or more of cost and transfer time to destination.

In another aspect a distributed space transportation network is disclosed. The network includes: a plurality of space tugs resident in orbits beyond earth's atmosphere; and a flight mission generator module configured to: determine a flight mission, comprising a selection of one or more space tugs and a set of orbital maneuvers for a space tug from the selection to rendezvous with a satellite; maneuver the space tug from the selection to the satellite based on the flight mission; and dock the space tug with the satellite; maneuver the docked satellite to a destination in space, using the propulsion provided from the space tug.

In one embodiment, the flight mission further comprises one or more hand-offs of the satellite between the selection of one or more space tugs until the destination is reached.

In another embodiment, the plurality of space tugs are launched to the orbits using the excess capacity of rockets launching satellites to space, wherein those rocket launches are offered at cost or near cost to purchasers of those launches.

In some embodiments, the network further includes one or more satellite depots resident in the orbits beyond earth's atmosphere, wherein the satellite depots are configured to store one or more of fuel, spare parts for space tugs and robotic capabilities to perform in-space repair for the space tugs.

In another embodiment, the flight mission further comprises a set of orbital maneuvers for one or more space tugs from the selection to rendezvous with one or more satellite depots to obtain fuel or robotic repairs.

In one embodiment, the space tugs are resident in LEO and the destination is in low earth orbit (LEO) zone, medium earth orbit (MEO) zone, geosynchronous (GEO) zone, or geostationary orbit (GSO) zone.

In some embodiments, determining a flight mission includes: estimating a trajectory of the satellite position after a period, comprising a propagation time parameter; receiving position and velocity data from one or more space tugs; selecting one or more space tugs to minimize a cost function; generate the set of orbital maneuvers from the selected space tugs to the satellite.

In another embodiment, determining a flight mission comprises selecting the one or more space tugs and the set of orbital maneuvers to minimize one or more of cost and transfer time to destination.

BRIEF DESCRIPTION OF THE DRAWINGS

These drawings and the associated description herein are provided to illustrate specific embodiments of the invention and are not intended to be limiting.

DETAILED DESCRIPTION

Figure 1:
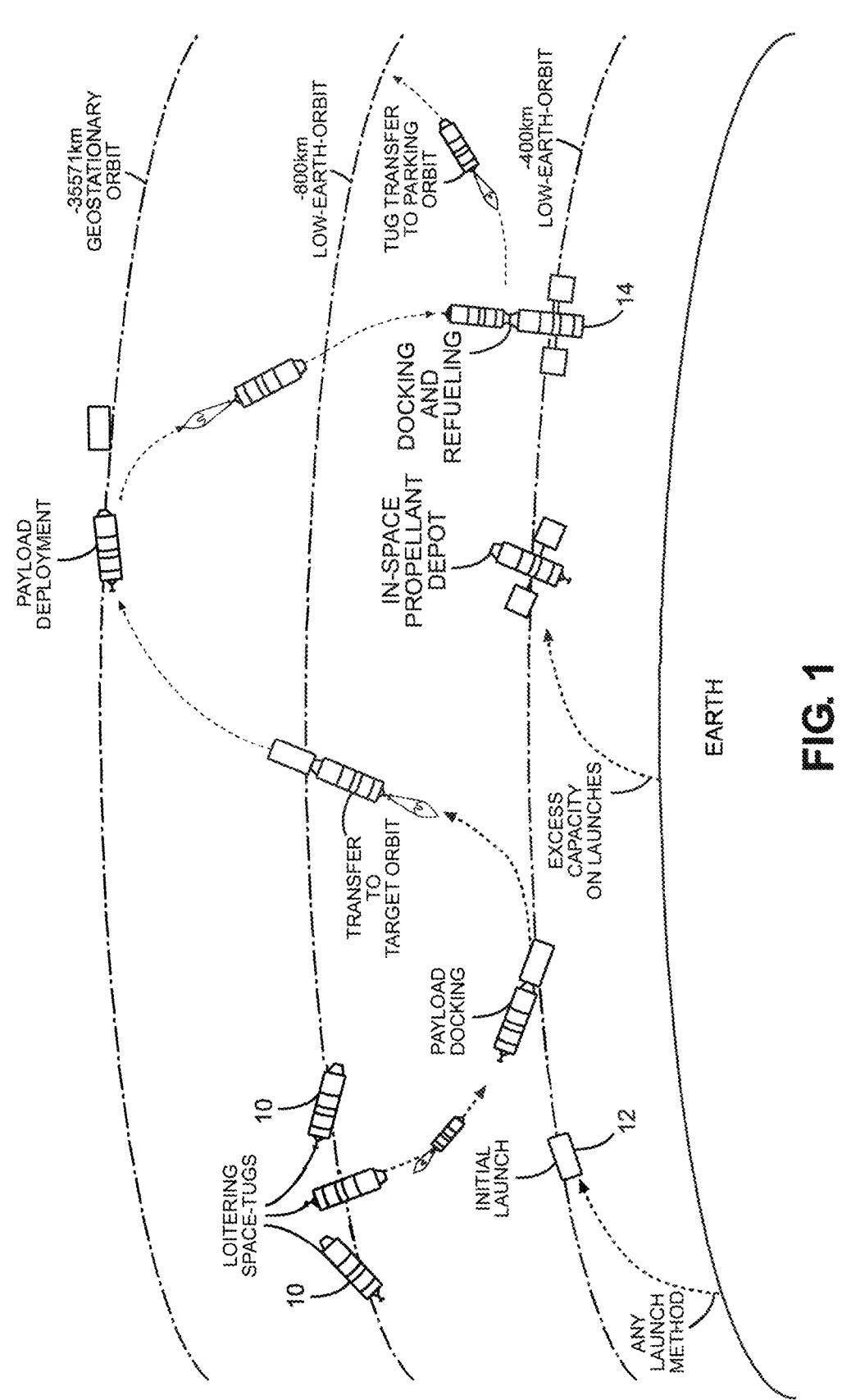
FIG. 1 illustrates an example mission accomplished using the disclosed distributed space transportation network.

The following detailed description of certain embodiments presents various descriptions of specific embodiments of the invention. However, the invention can be embodied in a multitude of different ways as defined and covered by the claims. In this description, reference is made to the drawings where like reference numerals may indicate identical or functionally similar elements.

Unless defined otherwise, all terms used herein have the same meaning as are commonly understood by one of skill in the art to which this invention belongs. All patents, patent applications and publications referred to throughout the disclosure herein are incorporated by reference in their entirety. In the event that there is a plurality of definitions for a term herein, those in this section prevail. When the terms "one", "a" or "an" are used in the disclosure, they mean "at least one" or "one or more", unless otherwise indicated.

Definitions

"Small satellites" or "smallsats" can refer to satellites of low mass and size, usually under 500 kilogram (kg) of mass.

"Impulse" can refer to the integral of a force over the time interval for which the force acts.

"Delta-V" parameter can measure the impulse per unit of spacecraft mass that is needed to perform a maneuver such as launch from, or land on a planet or moon, or perform an in-space orbital maneuver.

"Specific impulse" or "ISP" can refer to a measure of how efficiently a rocket or satellite uses its propellant. ISP can be calculated in variety of ways, resulting in expressions of ISP with different units. In one respect, ISP can refer to how much energy is generated by a spacecraft per pound of fuel. ISP can range from approximately 200 seconds for simple chemical engines to approximately 450 seconds for cryogenic ones and up to approximately 1500 seconds for electric engines.

"Inert mass" of a spacecraft can refer to the total mass of the spacecraft minus the mass of propellant and the mass of payload.

The problems with existing space transportation systems, as identified above, can be addressed by a distributed space transportation network, where satellites of any size can be launched to a convenient location (e.g., to LEO). From there, a network of space tugs and depots can transport satellites to their final destination. The network's space tugs and depots can be refueled and kept stocked with resources, such as replenishment fuel, spare parts, and robotic capabilities to refuel space tugs and perform maintenance, repairs and refueling, without the need for launching these supplies and services from the earth for every mission.

In order for a distributed space transportation network to ensure that the in-space actors are well-coordinated and well-managed, the network will necessarily involve both a hardware layer and software layer (or application layer). The hardware layer comprises physical elements of the network, including, e.g., in-orbit space tugs, propellant depots, and satellites, as well as earth-based launch vehicles and ground stations. The software layer serves as the manager and operator of the network. It serves as a portal for in-space service requests received from satellites or other entities. Further, it positions, generates paths for, and schedules hardware elements to meet network requests, while minimizing certain objective functions. For example, a customer (e.g., a person or entity interested in deploying a satellite for a mission) interacts with the distributed space network, aiming to transfer a payload from one point to another. This request is added to a set of requests which the network must deal with. The software layer positions the objects in space, generates paths for them, and schedules the hardware elements to meet the network requests and to fulfill the objective functions. This optimization and coordination at the application layer leads to lowered cost, lowered response time, fuel efficiency, and more. These aspects will be described in further detail below.

Example Mission

FIG. 1 illustrates an example mission accomplished using the disclosed distributed space transportation network. Space tugs 10 can be optimally placed in space in relation to where they are anticipated or planned to rendezvous and dock with a customer satellite 12. The customer satellite 12 can be a single satellite of any size or a cluster of satellites. The customer satellite 12 arrives at a convenient location (e.g., a LEO) by any launch method, for example using any of the methods described above. The space tug 10 can rendezvous and dock with the customer satellite 12 and propel the customer satellite 12 to its final destination orbit (e.g., a geostationary orbit). Once the customer satellite 12, arrives at its destination orbit, the space tug 10 can return to a parking orbit or rendezvous with a depot satellite 14 in order to refuel or acquire repair or maintenance services.

The space tugs 10, customer satellites 12 and depot satellites 14 can be considered nodes in the space distribution network, where each node can include inherent and current specification, such as max load capacity, max fuel capacity, rendezvous adaptors and interfaces, type of propulsion and various parameters related to response time of a node. The nodes' specifications along with other parameters can be used to generate and execute a mission profile, where one or more space tugs 10 and satellite depots 14 can meet, dock and subsequently deliver a customer satellite 12 to its final destination.

Methods

Figure 2:
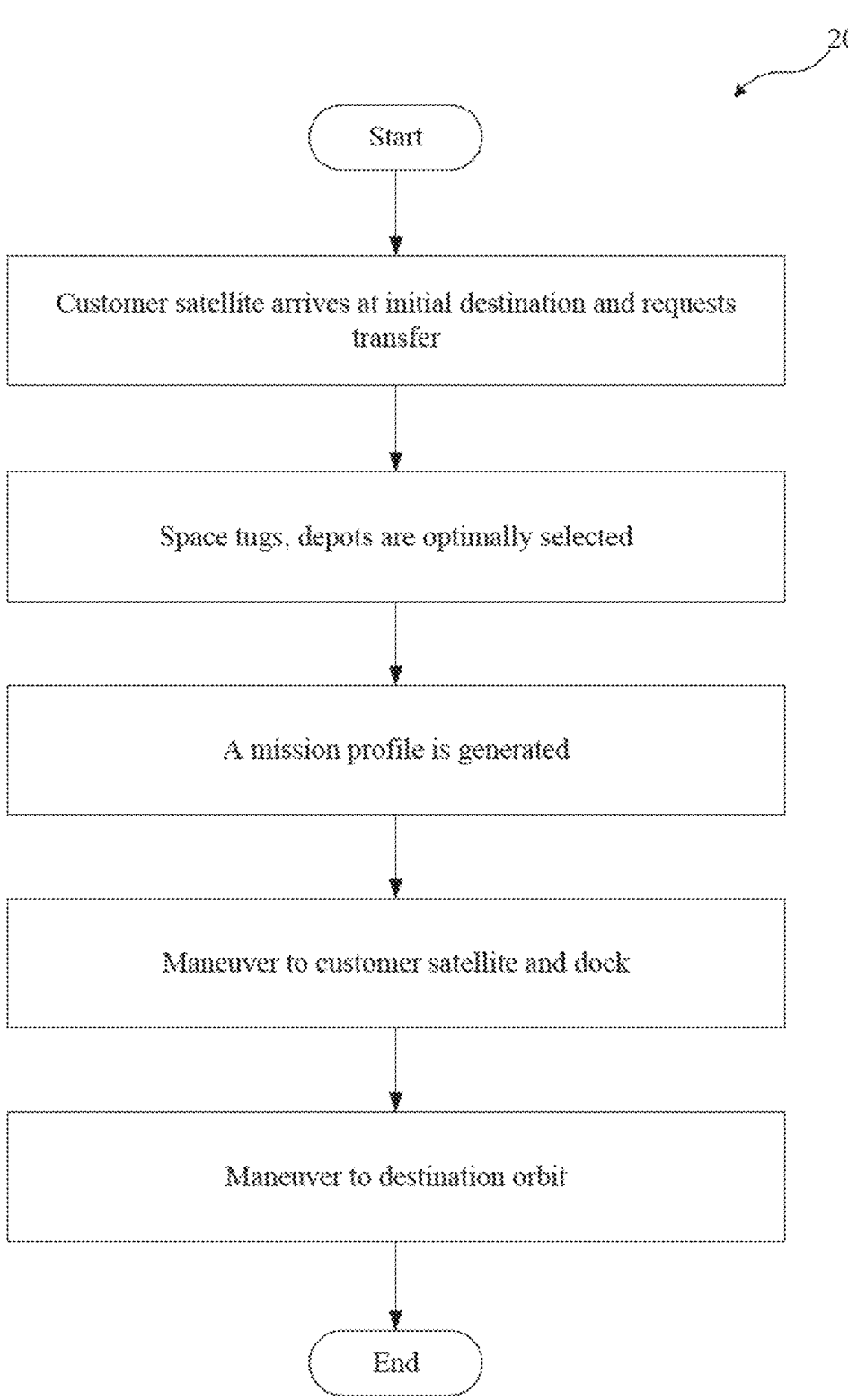
FIG. 2 illustrates a method of operation of a distributed space transportation network according to an embodiment.

FIG. 2 illustrates a method 20 of operation of a distributed space transportation network according to an embodiment. A network of space tugs 10 and satellite depots 14 are optimally positioned in space, for example, in parking orbits, and await the arrival of customer satellites 12. Space tugs 10 can have chemical or electrical propulsion capabilities and be able to rendezvous and dock with a customer satellite 12. Customer satellite 12 can refer to a satellite or a cluster of satellites that may be destined for a single final destination orbit, or may be destined for various different final destinations. The customer satellite 12 can arrive at its initial space location via any launch method and request a transfer to a final destination orbit. In other embodiments, the receipt of transfer request from a satellite 12 and/or optimal placement of the space tugs 10 and satellite depots 14 can occur before arrival of a customer satellite to its initial space destination. In other words, a space transportation network and its nodes can be optimally configured based on expected arrival of its customer satellites 12 and their respective final destinations. In another embodiment, the space transportation network and its nodes can be optimally configured after receipt of a set of orbit transfer requests from a customer satellite 12. A set of space tugs 10 are optimally selected from a pool of space tugs. The selection is optimized for parameters, such as fuel consumption, time of flight or other metrics, as may be requested from a customer satellite 12. As an example, a customer satellite may need priority delivery to a destination orbit, in which case space tugs 10 with chemical propulsion capability may be assigned to that customer satellite 12 (chemical propulsion space transportation can deliver in shorter time, albeit at substantially more cost, compared to electrical propulsion techniques).

Along with selection of space tugs 10, a mission profile can be generated, which can include the orbital maneuvers for selected space tugs 10 to meet and dock with the customer satellite 12 and transport it to its final destination. The mission profile can also include other items, such as hand-off of customer satellite 12 between two or more space tugs 10, and potential rendezvous with depot satellites 14. After the mission profile is generated, the selected space tugs 10 and depot satellites 14 execute the mission profile, by for example, performing the orbital maneuvers therein, meeting the customer satellite 12, attaching to it and delivering it to its final destination. In some embodiments, the mission profile also optionally includes payload hosting, where space tugs 10 can provide power, communication systems and/or other services and resources to the customer satellite 12 for a period of time or for the docking duration.

Software and Hardware Layers

Figure 3:
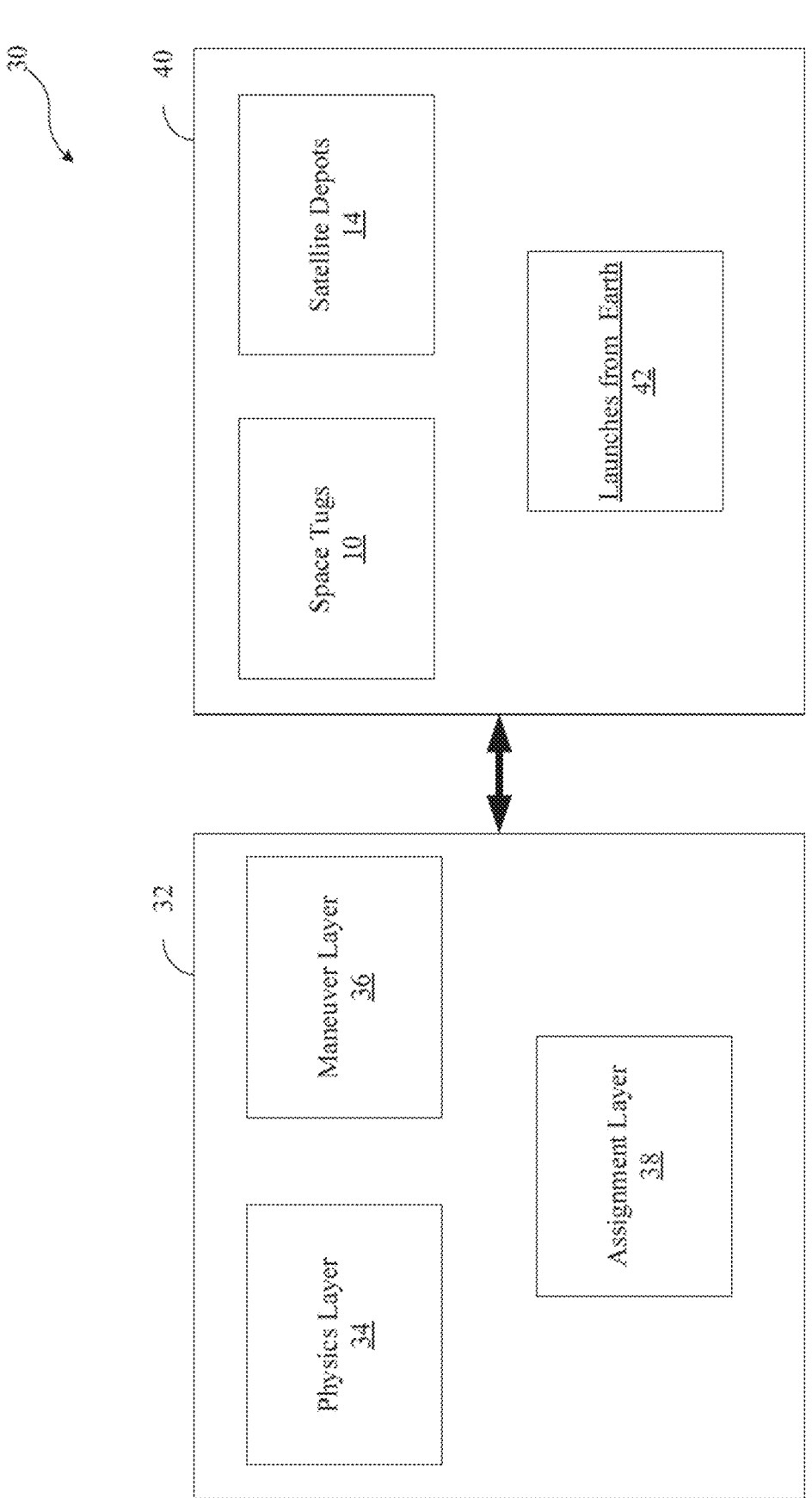
FIG. 3 illustrates a distributed space transportation network (DSTN) and its components according to an embodiment.

FIG. 3 illustrates a distributed space transportation network (DSTN) 30 and its components according to an embodiment. In one respect, the DSTN 30 includes a software layer 32 and a hardware layer 40. The software layer 32 can manage the DSTN 30 and its operations. In one embodiment, the software layer 32 can include a physics layer 34, a maneuver layer 36 and an assignment layer 38.

The physics layer 34 functions to model and predict future behavior of the hardware elements in space. In various embodiments, the behavior may include trajectories, communications, available power, and/or any other suitable future behavior to be predicted. In some embodiments, the physics layer functions to estimate a trajectory of a spacecraft in time and output the spacecraft's physical parameters, such as position and velocity at a particular time in the future. In some embodiments, the physics layer functions to predict what will happen to a spacecraft in orbit. This is necessary because all objects and nodes (e.g., satellites, space tugs, depots, and final destinations) are moving in relation to one another in terms of relative position, and there are costs associated with moving between these different points which must be calculated. Therefore, the physics layer is necessary to predict the future behavior of hardware elements. In some embodiments, the physics layer can predict, e.g., trajectories of the hardware elements, communications between hardware elements, available power, and more. In some embodiments, identifying the location of spacecraft in particular is important. In some embodiments, the physics layer functions to identify whether a given spacecraft has battery power, can be communicated with, has the autonomy to complete a given task, and/or any other suitable information. The physics layer does not merely employ a selection algorithm; rather, it functions to properly and accurately model the behavior of objects in space.

The maneuver layer 36 functions to compute paths between points in space. In some embodiments, the maneuver layer outputs a set of maneuvers which a spacecraft can utilize to travel from a departure position to a destination position in space. In some embodiments, this includes, e.g., determining not just how the orbit is going to change over time, but also how to move a spacecraft from one orbit to another orbit. In some embodiments, the maneuver layer takes cost of movements into account.

The assignment layer 38 functions to optimally choose space assets in the hardware layer 40 to transport a customer satellite 12 from its initial arrival point in space to its final destination in space. This enables the optimization of routing of multiple orbit transfer requests and objective functions. For example, if there are multiple existing transfer requests involving multiple orbits, the assignment layer may operate to optimize the requests based on, e.g., total cost of network, minimizing fuel cost, total space time, total resources spent in a certain timeframe, minimizing the amount of fuel spent over a period of time (e.g., 6 months), and/or any other suitable optimization parameters. In some embodiments, the assignment layer takes into account different hardware elements in different orbits for a given point in time, identifies destinations, identifies assets, performs the assignment of each different asset to each different customer, and generates mission profile(s) which can then be executed on hardware elements.

The hardware layer 40 can include the space tugs 10, the satellite depots 14 and other spacecraft which may be launched from the earth for various purposes, such as refueling and restocking the satellite depots 14.

Figure 4:
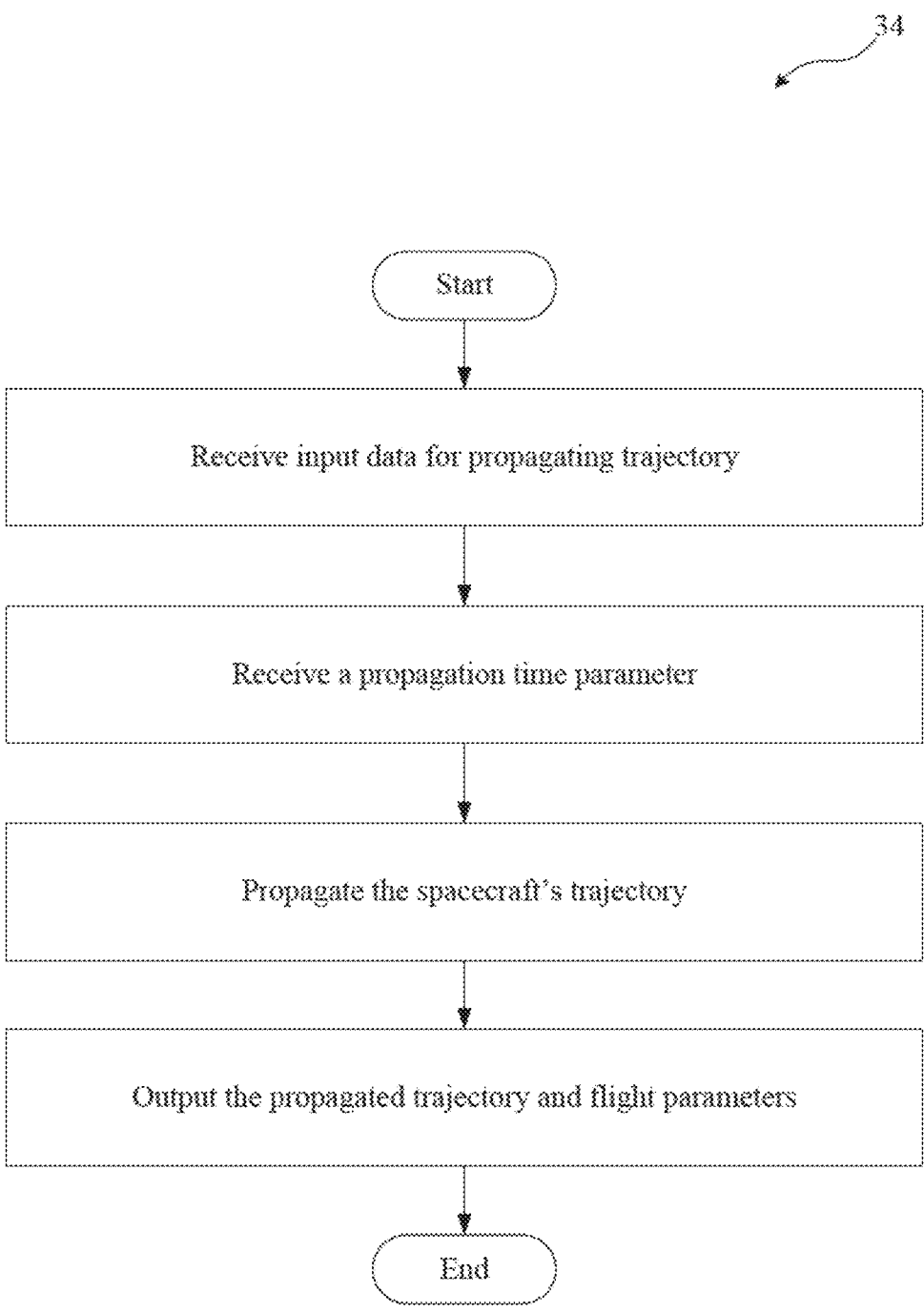
FIG. 4 illustrates an example operation of the physics layer.

FIG. 4 illustrates an example operation of the physics layer 34. In some embodiments, the physics layer 34 is used to propagate the trajectory of spacecraft over time. In one embodiment, the physics layer 34 receives input data, i.e., received data that can be used to estimate the trajectory of a spacecraft. The input data can include, e.g., the spacecraft's current state, including its position and velocity. The input data can come from the spacecraft and its communication facilities, or by observation from earth or another spacecraft, or by other means.

Next, the physics layer 34 can receive a propagation time parameter, indicating how far in time the spacecraft's trajectory should be estimated. For example, the spacecraft's trajectory may need to be estimated one or two months in advance.

Next, the physics layer 34 executes a propagation algorithm that, given input data and propagation time, estimates the spacecraft's future trajectory, taking into account phenomena, such as, e.g., gravity effects (from the earth and/or other celestial bodies), solar radiation effects, solar wind effects, atmospheric effects (e.g., drag and lift) and other factors that might affect a spacecraft's trajectory. Next, the physics layer 34 outputs the propagated trajectory and flight parameters of the spacecraft. In one embodiment, this includes an estimation of position and velocity and other flight parameters of the spacecraft at a future time (e.g., at the propagation time). In other embodiments, the physics layer 34 can output an algorithm, that in turn, can output flight parameters of a spacecraft at any time in the future (with an upper bound, such as propagation time).

The physics layer 34 can be used to propagate the trajectory of any spacecraft in the DSTN 30. For example, the physics layer 34 can propagate the trajectory of customer satellites 12, space tugs 10 and satellite depots 14. The propagated trajectories can be used for rendezvous and docking purposes and to arrange for different nodes in the DSTN 30 to meet in space. In one embodiment, the physics layer 34 can be executed by other components of software layer 32, in order to obtain parameters for their operations.

Figure 5:
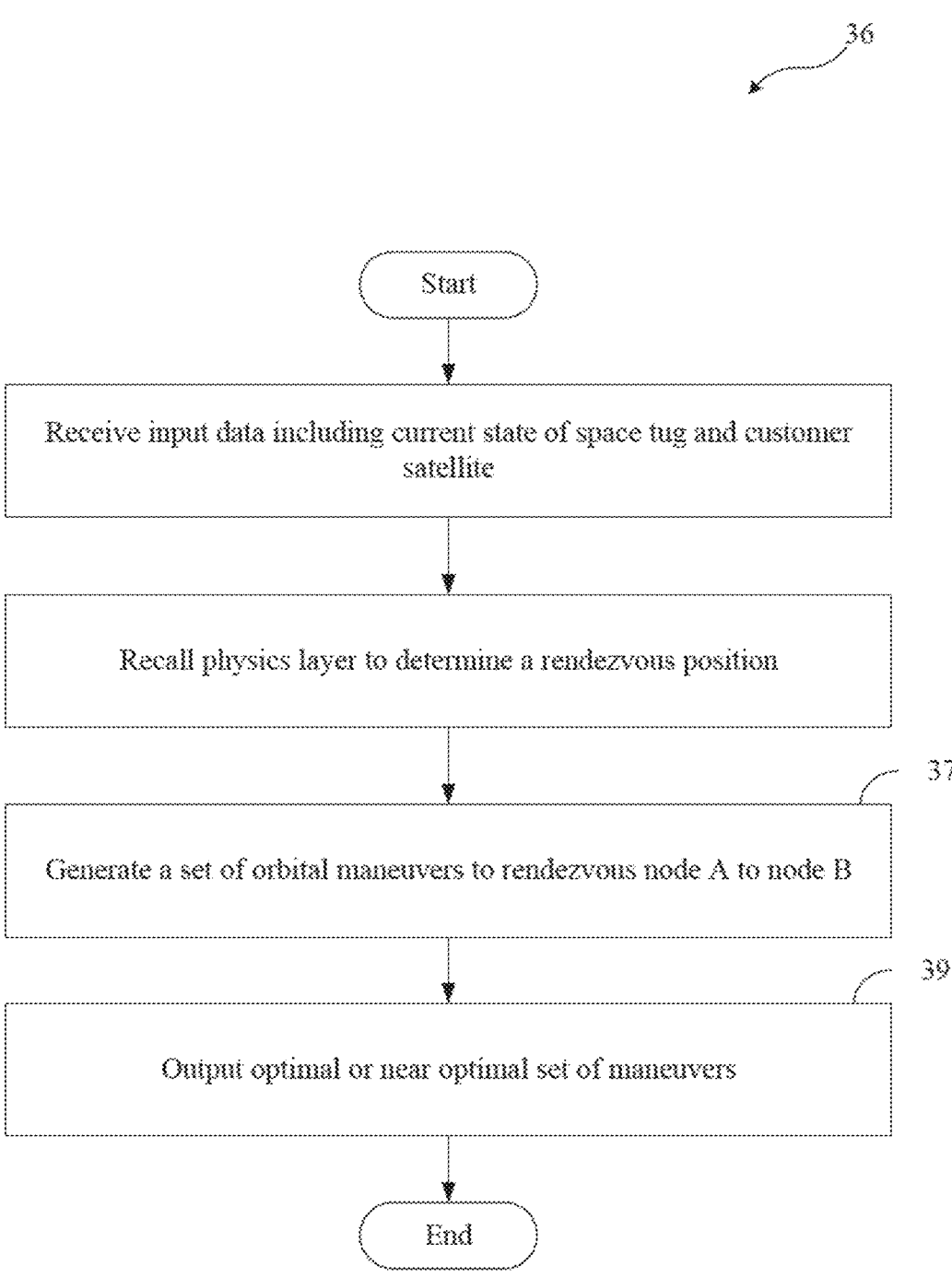
FIG. 5 illustrates an example operation of the maneuver layer.

FIG. 5 illustrates an example operation of the maneuver layer 36. The maneuver layer functions to compute paths in space. In some embodiments, the maneuver layer 36 can be used to determine potential paths between nodes in space, or paths between positions in space and to determine which paths are optimal given the operational parameters of the DSTN 30 and/or the customer satellites 12. The maneuver layer 36 can also determine and output various parameters associated with the paths, such as transfer time and delta-V. In one embodiment, the maneuver layer 36 can determine optimal paths between nodes of the DSTN 30. For example, from a space tug 10 to another space tug 10, or from a space tug 10 to a satellite depot 14, or more commonly, from a space tug 10 to a customer satellite 12. Additionally, the maneuver layer can determine paths from a node in the DSTN 30, to and from a position in space. For example, the maneuver layer 36, can determine an optimal path from a rendezvous position of a space tug 10 and customer satellite 12 to a final destination of the customer satellite 12.

The maneuver layer 36 receives input data including data on a node of interest of the DSTN 30. For example, the maneuver layer 36 can obtain data on a current state of a space tug 10, including its position, velocity, propulsion capabilities and other specifications, such as data on thrusters, boosters, re-ignitable stages, power to weight ratio, or other efficiency measures. In one embodiment, the maneuver layer 36 can also receive data on customer satellites 12, such as desired cost to final orbit, within which an operator of the customer satellite 12 may like to request a transport. For some satellite operators, the time is of essence, and they would like their satellites delivered to their destinations as soon as possible. For these customer satellites 12, the maneuver layer 36 can determine paths that optimize for fastest delivery and response time (RT). Other operators might want a transport within certain cost parameters. The maneuver layer 36 can determine a set of orbital maneuvers to rendezvous a space tug 10 to a customer satellite 12 and deliver it to its final destination, and output the optimum or near-optimum set of orbital maneuvers based on the operator's desired cost parameters.

After receiving input data, the maneuver layer 36 can recall and execute the physics layer 34 to determine a rendezvous position. For example, if a space tug 10 is to rendezvous with a customer satellite 12, attach to it and transport it to its destination, the maneuver layer 36 can execute the physics layer 34 to determine the estimated position, velocity and other flight parameters of the customer satellite 12. Next, the maneuver layer 36 can generate a set of orbital maneuvers that if executed can rendezvous the space tug 10 and the customer satellite 12. Next, the maneuver layer 36 can use one or more desired parameters to choose an optimum or near-optimum set of orbital maneuvers that can rendezvous the space tug 10 and the customer satellite 12. Desired parameters can be any parameters of interest to the operator of the DSTN 30 or the operator of the customer satellite 12. In one embodiment, the optimization parameter of interest can be cost to final orbit, which can take into account, various costs that may be associated with transporting a customer satellite 12 to its final destination. These costs can include cost of fuel to the operator of the DSTN 30, a marginal cost of repairs, depreciation, and/or other cost parameters. In another embodiment, the optimization parameter of interest for maneuver layer 36 can be time to destination parameter. In another embodiment, the optimization parameter can be a parameter combining both cost and time to destination parameters.

In some embodiments, the maneuver layer incorporates one or more penalty layers, which add a factor that takes into account how much cost the object (e.g., satellite) will be generating over time. This can determine, for example, how quick the maneuvers will be that allow the overall cost to be the lowest possible within the scenario.

Figure 6:
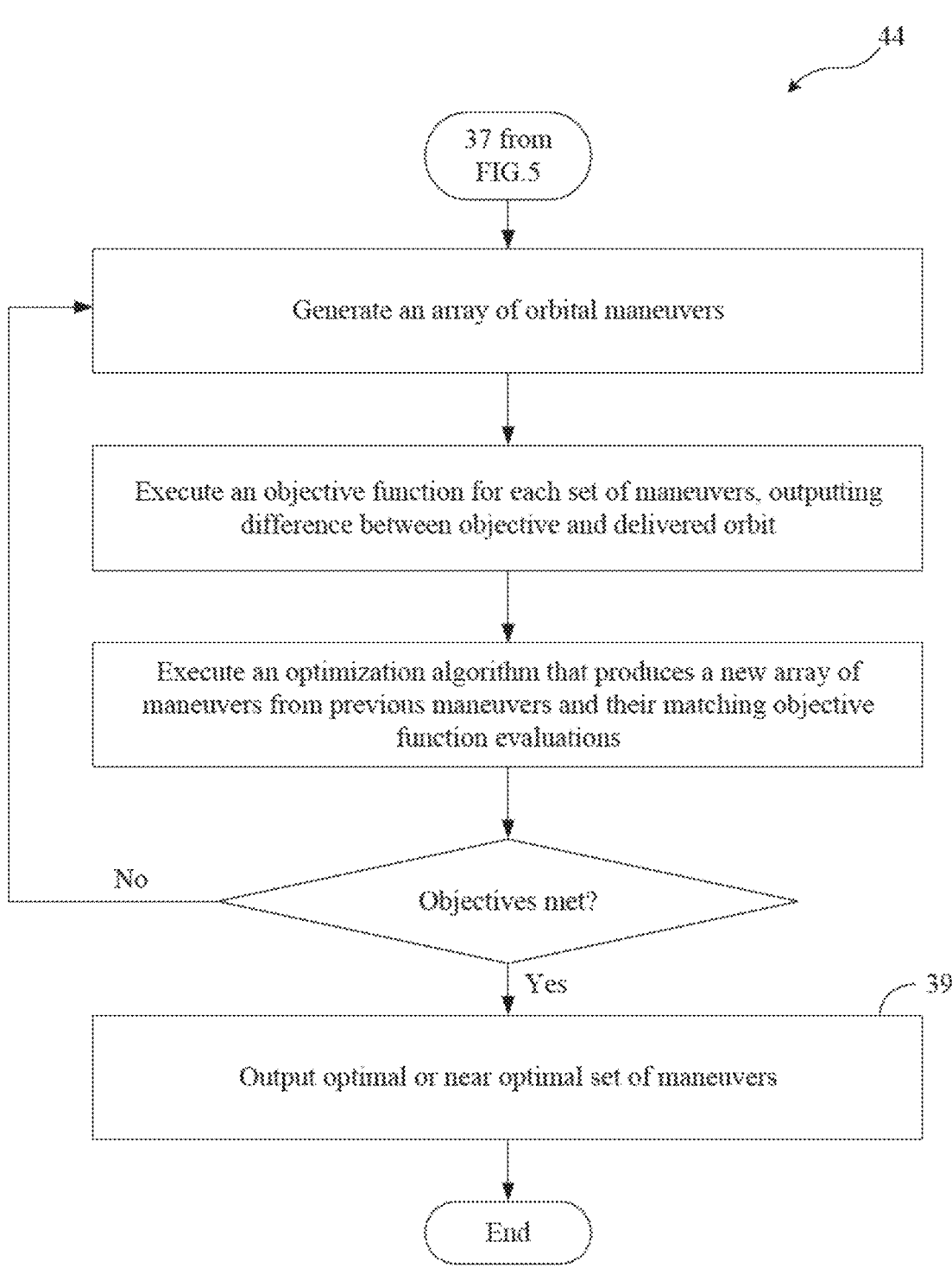
FIG. 6 illustrates an example method, which the maneuver layer can use to generate an optimum set of orbital maneuvers given one or more optimization parameters.

FIG. 6 illustrates an example method 44, which the maneuver layer 36 can use between steps 37 and 39 to generate an optimum or near-optimum set of orbital maneuvers given one or more optimization parameters. For ease of description, we assume the method 44 is applied to determine an optimum set of maneuvers to move a space tug 10 to a customer satellite 12, however, the described methods can be used to determine optimum or near-optimum set of orbital maneuvers for any two nodes within the DSTN 30 and/or between a node in the DSTN 30 and a position in space. For example, the described methods of the maneuver layer 36 can be used to determine optimum or near-optimum orbital maneuvers to transport a docked space tug 10 and customer satellite 12 from LEO to the final destination of the customer satellite 12 in geosynchronous equatorial orbit (GEO).

At step 37, a set of orbital maneuvers is generated. The orbital maneuvers can include impulsive, or continuous maneuvers and can depend on the specifications of the underlying DSTN 30 nodes. For example, some maneuvers may include chemical propulsion, while others include electrical propulsion maneuvers or a combination of the two. The set of orbital maneuvers generated at step 37 can be used to construct an array of orbital maneuvers (AOM). In the example of space tug 10 to customer satellite 12, the AOM includes sets of maneuvers to be applied to the space tug 10 to rendezvous with the customer satellite 12.

Next, an objective function for each set of maneuvers in the AOM can generate a delta parameter (DP) indicating the difference between an objective target orbit and delivered final orbit. The DP values can be added to the AOM. The objective function can be for example a cost function based on actual cost and/or time to destination parameter. Next, an optimization algorithm produces a new AOM based on previous values of AOM and its DP values until one or more objective parameters, such as cost or time to destination are met. If the objective parameters are not met, the method 44 repeats the previous steps from step 37, until the objective parameters are met. At step 39, a set of optimal or near-optimal orbital maneuvers are generated. In one embodiment, the near optimal orbital maneuvers are the pareto-dominant values for total transfer time and delta-V.

Figure 7:
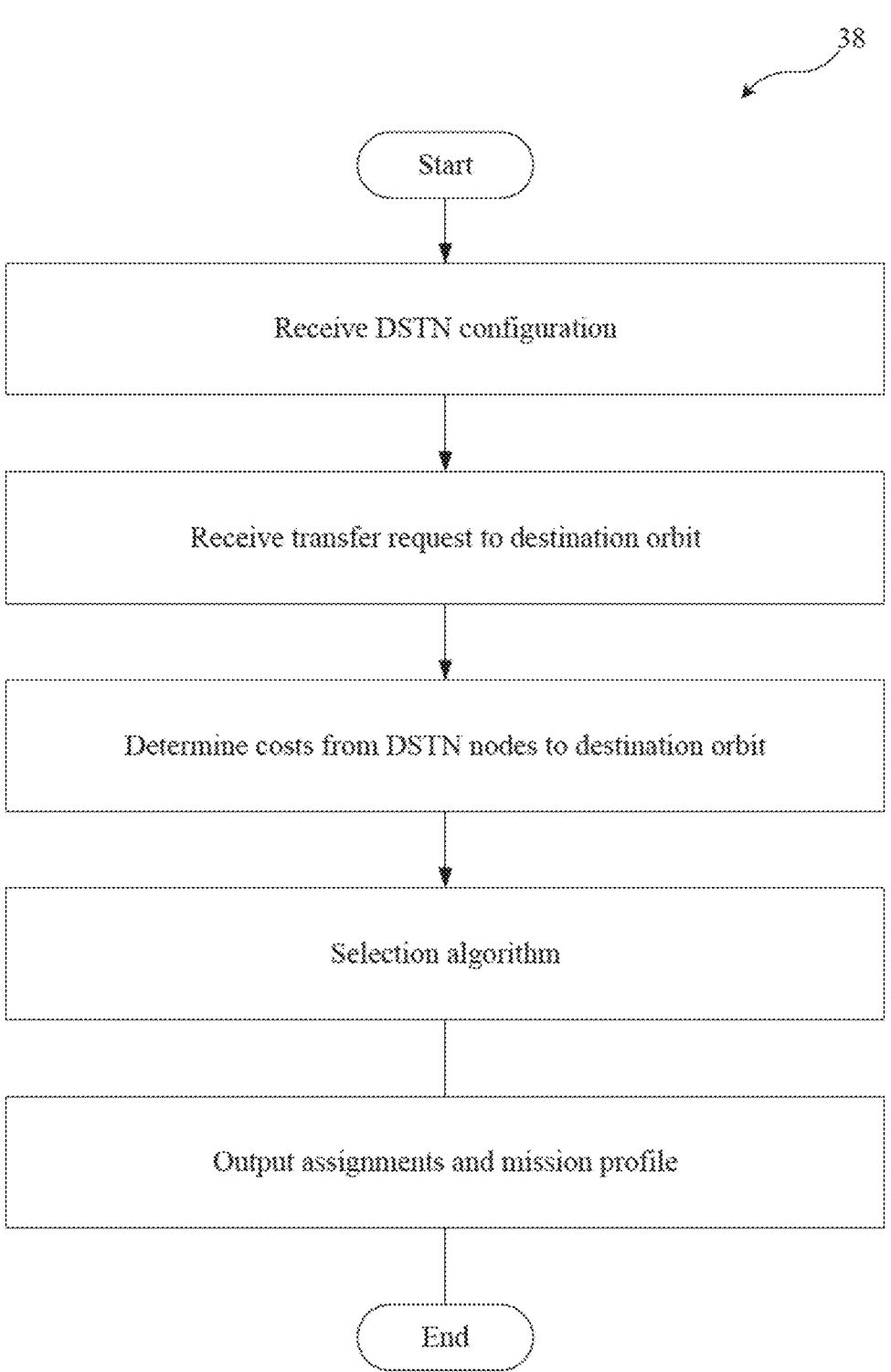
FIG. 7 illustrates an example operation of the assignment layer.

FIG. 7 illustrates an example operation of the assignment layer 38. The assignment layer functions to enable routing optimization for multiple orbit transfer requests and objective functions. For example, it may not be that just one object may need to move from one particular orbit to another particular orbit, but instead that there are multiple transfer requests involving multiple satellites, which may involve multiple space tugs. The assignment layer optimizes these components to meet different objective functions, e.g., optimizing for the total cost of the entire network, minimizing the total fuel cost that is spent, minimizing the total time, minimizing the total amount of resources that are expended within a certain timeframe, using the least amount of fuel over a given timeframe (e.g., the next 6 months), optimizing for lowering the total time, and/or any other suitable objective function related to routing of these different elements. In some embodiments, at a general level, the assignment layer functions to identify all of the relevant assets present within a received configuration, and perform the assignment of each different asset to each different customer, generate a mission profile, and then send those mission profiles to the hardware elements where they are executed. In some embodiments, the assignment layer determines the cost for the life cycle of the mission from each node to the final destination. This can include, e.g., the cost from one particular space tug or satellite, to its destination, to its depot, etc. In some embodiments, the assignment layer utilizes a selection algorithm to output assignments and mission profiles and execute them, such as, e.g., a traveling salesman problem algorithm, auction algorithm, or any other suitable selection algorithm.

In some embodiments, the assignment layer 38 is used to select one or more space tugs 10 and generate a mission profile for rendezvousing with a customer satellite 12 and transporting it to a desired destination. In one embodiment, the assignment layer 38 receives the initial configuration data of the DSTN 30. The configuration data can include, the available space tugs, depot satellites and their respective current status data (such as position and velocity). The configuration data can also include hardware layer 40 data, such as initial dry mass, ISP, fuel state and other specifications of the components of the hardware layer 40. The specification data of the hardware components 40 can include, power to weight ratio and efficiency data, capabilities and compatibility data (e.g., data on the type of docking adaptors and interfaces, data on ability to provide payload hosting).

In one embodiment, the assignment layer 38 can also receive data on available or upcoming launches from the earth, from which it can offer an optimal launch and space transportation itinerary to a customer satellite 12. Such data can include, launch schedule (launch date), timing and target orbit data, expected orbit, cost data, capacity data, payload compatibility data and other data that can be used to estimate the in-space behavior and/or performance of a launch vehicle in relation to a customer satellite 12.

Next, the assignment layer 38 can receive a set of orbital transfer requests (OTRs). The OTRs can be from the customer satellite 12 or from the output of the maneuver layer 36. The OTRs can include a departure position in space (such as the initial launch position of a customer satellite 12 and a destination position in space (such as the final desired destination of a customer satellite 12). Additionally, the assignment layer 38 can receive secondary data, such as requested time to destination for a customer satellite 12, and potential value loss per unit of time. Potential value loss per unit of time can be a parameter in optimization algorithms described herein to minimize or reduce value loss due to delay in reaching target destination for a customer satellite 12.

Next, the assignment layer 38 can determine costs from each network node to the customer satellite 12 and from there to destination position of the customer satellite 12. The maneuver layer 36 can be used to determine a cost function associated with an OTR from a node or an asset (such as a space tug 10) to a customer satellite 12 and from there to final destination of that satellite. In one embodiment, the cost associated with an OTR can be augmented with the value loss per unit of time to a customer satellite operator, incurred during transfer to final destination time. If the customer's satellite can function in transit using the hosting capabilities of the space tugs 10, then the value loss is accordingly reduced to account for hosting.

Next, a selection algorithm can be chosen to find an optimum selection of space tugs and an associated mission profile. In one embodiment, an auction algorithm can be used to find a tug assignment and set of OTRs that minimizes the cost functions. When a set of space tugs 10 (and/or depot satellites 14, if applicable) are chosen, the mission profile can be executed to deliver the customer satellite 12 to its final destination.

Initial Build-Up of the DSTN 30

In one embodiment, the DSTN 30 can include a plurality of in-space assets, such as space tugs 10 and satellite depots 14, in order to provide coverage of the earth's orbital space to customer satellites 12. One method to launch and build up the initial plurality of the space assets in the DSTN 30 is to leverage the demand for small satellite launches. As described earlier, the increasing demand for smallsat launches and scheduling differences between the operators, translate to an increase in availability of launches with excess capacity. This excess capacity can initially be used to launch the initial space assets of the DSTN 30 and to provide supplies and replacements to the DSTN 30. In another embodiment, launch space can be purchased and offered at cost to smallsat operators to utilize the excess capacity for launching the assets of the DSTN 30. Using this approach, the assets of the DSTN 30 can reach space for nearly free or at very low cost.

Advantages of the Disclosed Systems and Methods

The disclosed embodiments of space transportation networks make space transportation cheaper and quicker.

In spacecraft technology, the amount of fuel required to accelerate a given mass increases exponentially with respect to the change in velocity to be imparted (delta-V), and the efficiency of the spacecraft's engines (ISP).

$$\text{fuel\_mass} = \text{payload\_mass} * e^{\wedge}\left(dV/ISP\right)$$

In one respect, Delta-v is the "cost" to transport a spacecraft between different points in space. The ISP is how much energy is generated by each pound of fuel. It can range from ~200 seconds for simple chemical engines, to 450 seconds for cryogenic ones, and up to 1500 seconds for electric engines. Different engines are suited for different applications. Electric engines are efficient & low thrust, so they are used in non-time-critical missions. Chemical engines are high thrust, so they are used in launch and altitude control. Ideally, the max payload would be dictated by the maximum fuel-mass and the delta-V to be delivered, but engines, fuel-tanks, and avionics subtract from the potential payload mass. This "inert-mass" is related to the liftoff-mass by the inert-mass ratio (s). Values range from 0.05 (5% of the liftoff-mass is inert) for launch-vehicles, to ~0.4 for electric propulsion systems.

Figure 8:
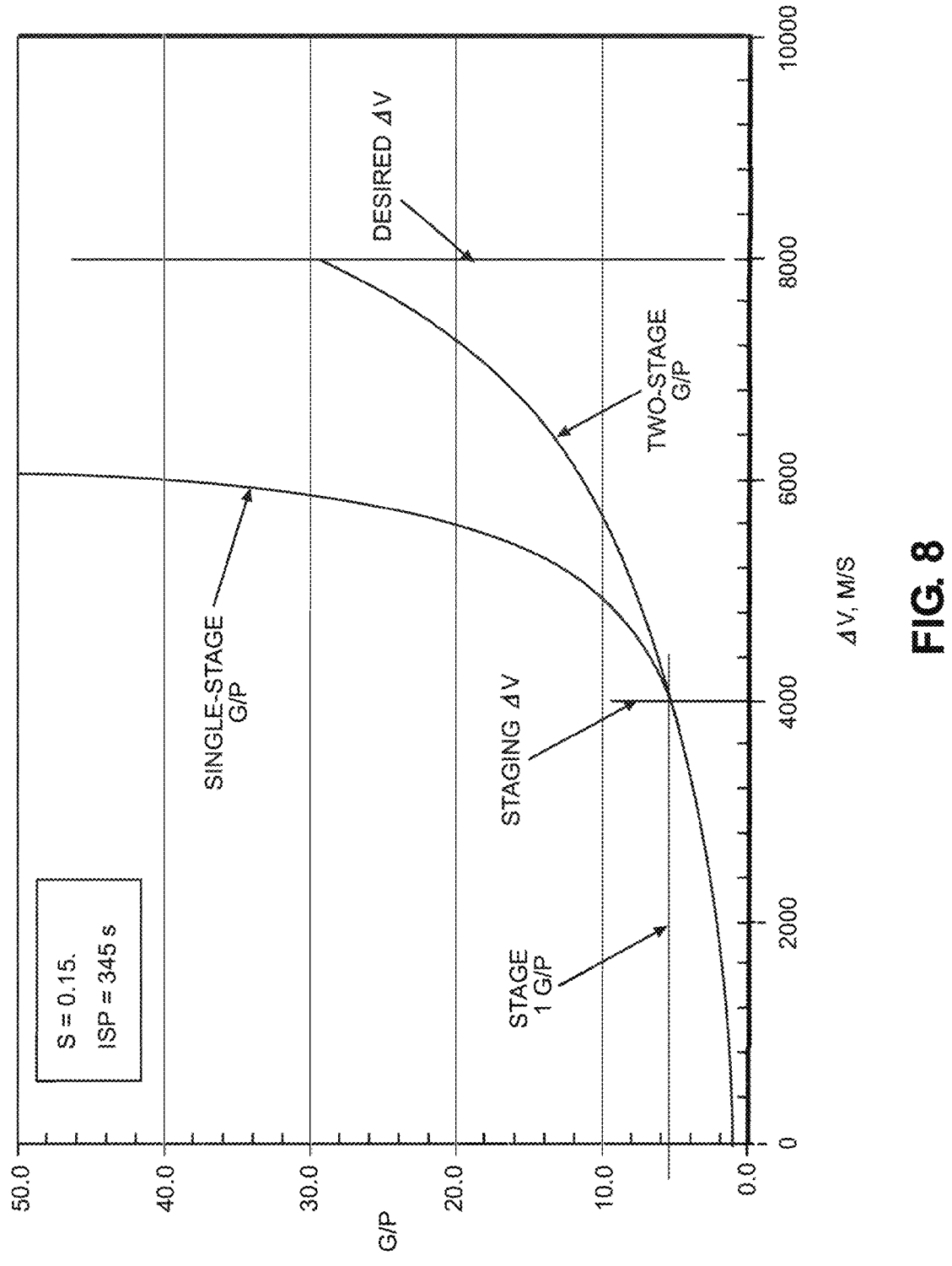
FIG. 8 is a graph illustrating the lift-off mass (G) to final payload mass ratio (P).

To achieve delta-v beyond what each individual vehicle's base mass would allow, we turn to staging. Staging is distributing the desired change in velocity over multiple vehicles, one stacked on top of the other; lower stages boosting upper stages to a given staging velocity. An important rocket metric to understand this is the ratio of lift-off mass (G) to final payload mass (P). FIG. 8 is a graph that illustrates this ratio for a given (s) and (ISP).

For direct-to-destination approach to space access and transportation, launch-vehicle designers would optimize each stage (engine type, fuel capacity, etc.) to minimize the G/P to a given orbit. For geostationary transfer orbits (largest launch market), this led to using high-performance cryogenic core-stages aided by many solid boosters. By varying the number of boosters on lift-off, single vehicles would service many payloads, always leveraging the same core design, and enjoying a relatively low (efficient) G/P. However, today's space industry requirements demand a different approach.

Instead of building families of vehicles and creating many variations to tailor performance for particular missions, launch companies can utilize a one size fits all approach to space-transportation, with one or two vehicle variations at most. Leveraging mass-production techniques and commonality between stages, the launch companies can abandon lowering G/P as a design metric, and can instead focus their designs toward lower complexity and marginal cost. In one respect, they can give up on physical "efficiency" for actual cost per kg.

At the same time, launch companies are also interested in reusability. Instead of discarding rockets after flight, they can sacrifice some payload for fuel and landing back to earth after a successful launch. On the other hand, this approach will decrease bulk cost to LEO, but will have an exponentially negative effect on payload to GTO. For example, fully reusable 2-stage launch-vehicles will only be ~½ as efficient at direct transfers to GTO versus previous generations of rockets (for every 10 lbs. delivered to LEO, they will only deliver 2 lbs. to GTO (vs 5 lbs. before)).

Consequently, launching direct to final destination includes the inherent limitation outlined above. The disclosed embodiments of a distributed space transportation network solve these issues. In-space reusable rockets (stages that stay in-orbit and perform multiple transfers to high-energy orbits) perform in-space transportation. The space tugs 10 of the DSTN 30 are effectively "de-facto" staging, without the penalty of having to launch from the earth for every transfer request. These tugs will more efficiently perform GTO insertions, using cheaper fuel brought to LEO in the process.

There is also a number of other challenges that the disclosed embodiments help to solve. As described earlier, the average satellite is getting smaller (~150 kg), but in contrast, the cheapest rockets are becoming larger (~100.000 kg). Options for affordable, practical, and scalable launches of the increasingly small-satellites are limited, and demand for launches to far-off destinations (geostationary transfer, moon orbit, etc.) is only increasing. Rides on reusable vehicles will be relatively infrequent. With launch representing only a fraction of a large satellite's cost, it is unlikely launch companies will see much of an increase in cadence as they drop prices, and their rockets being larger than all current payloads, they will be flying with even more unused capacity (40% or more).

Reusable launch vehicles will also be twice less efficient at directing inserting satellites to far-off destinations due to the exponential stacking of various performance penalties (namely, those related to cost and reuse instead of efficiency). LEO small-satellite operators will soon need to deploy hundreds of satellites, and will likely turn to price per-kg as the main differentiator between providers. They could leverage large rockets' unused capacity and lower cost, but constellation satellites deployed on them would need to be able to spread out after launch to be effective. Furthermore, adding onboard propulsion to enable this would not be as straight-forward as one would think. For example, existing chemical propulsion systems for smallsats are bulky and usually have low ISP, limiting the overall delta-V capacity and subtracting from the available payload volume (though they can be quick to transfer). Electric-propulsion on the other hand, would enable high delta-v maneuvers, but would also place massive power burdens on satellites. Electric propulsion thrusters are also fairly expensive (approximately $100 k to $500 k for reliable ones), and it can take months for them to transfer a payload to final destination (months that might cost a satellite operator substantial lost revenue.

Riding on custom-sized small-rockets would destroy the unit economics of constellations, as smaller rockets are almost an order of magnitude less efficient than larger ones (on price per kilogram). So, unless this is addressed, they'll only be used for a fraction of all missions (demonstrators/ early deployment/military satellites and the like). This lack of efficiency also means that direct missions on small rockets beyond low-earth orbit are highly unlikely, as their performance decreases to near zero very quickly.

Dedicated space-tugs, which are co-riders on launch would find themselves grappling with the same trade-offs that smallsats w/propulsion face. Those include, for example, long transfer times, high cost, limited payload mass and volume transport capability, and low power. For some tugs, such as electric tugs, this would mean a duplication of engineering efforts and development and duplication of substantial cost. Upper-stage based tugs would need more propellant to lug their large inert mass around, which would make them inefficient, rare, and difficult to justify developing.

The disclosed embodiments of distributed space transportation networks, address these issues by enabling any satellite to launch on any launch-vehicle, regardless of what initial orbit that rocket is going to (beyond some commonly accepted standard orbits). This would allow launch-providers to compete on an even playing-field, where they can optimize their operations for parameters such as their response time, cost per kilogram, scalability, and ease of use.

Since the space assets of the DSTN 30 can act as in-space stages that do not need the extra fuel to land back on earth and they be reused in space, they can deliver payloads to far-off destinations with twice as much efficiency of reusable upper-stages. The DSTN 30 can also provide services to spread satellites across many different planes for constellations, and at the price of fuel cost to LEO. This can enable effective single-satellite replacements on rideshares, and dedicated multi-manifest missions.

Figure 9:
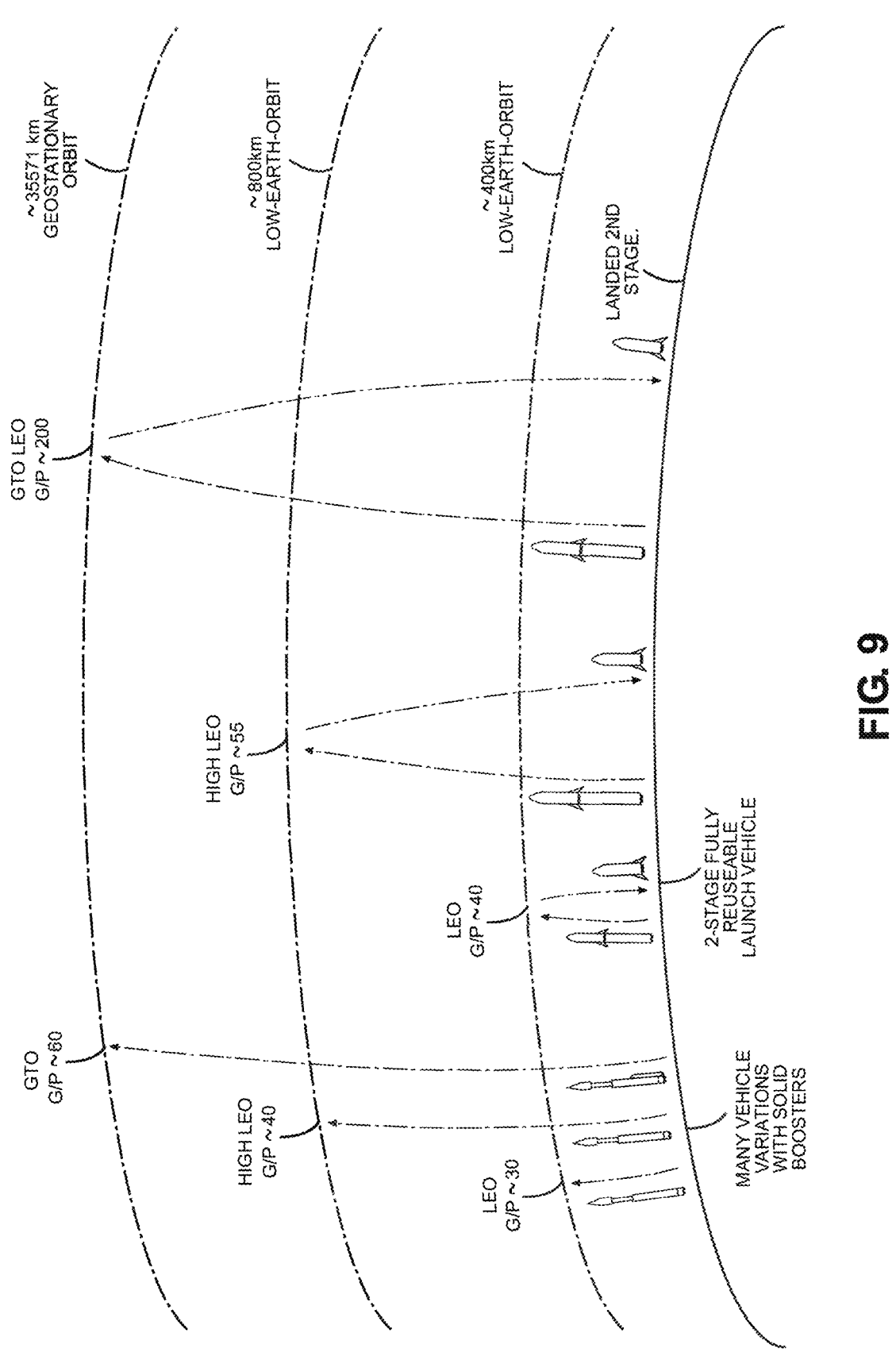
FIG. 9 illustrates the performance cost of reusable upper-stages, relative to the use-and-dispose rocket launches.

FIG. 9 illustrates the performance cost of reusable upper-stages, relative to the use-and-dispose rocket launches. The DSTN 30 achieves higher efficiencies of use-and-dispose and reusable upper-stages and can be superior to both these space transportation methods.

In another respect, the DSTN 30 decouples spacecrafts from propulsion-related tradeoffs and both the marginal and non-recurring expenses that are associated with them. In one embodiment, utilizing the DSTN 30 would be 30 times quicker than electric propulsion, and 10 times cheaper than onboard chemical propulsion (assuming in-orbit fuel cost of $5,000/kg).

The DSTN 30 can allow small rockets to become economically feasible and practical because they can launch to LEO and using the DSTN 30 can be launched to far-off destination, that without the benefit of the disclosed embodiments would have required a large rocket launch. As an example, satellite operators do not need a 10-ton rocket to carry their satellites to GEO, but rather they can use a 3 ton rocket to LEO and use the space tugs 10 to insert into GEO. Furthermore, utilizing the DSTN 30 can justify the duplication of efforts through in-space reuse. In the electric-tug case, the DSTN 30 allows approximately 6 times more reuses, as chemical tugs can bring them quickly to a satellite depot 14. For upper-stage tugs, in-space refueling (as opposed to returning to earth) would make them highly capable direct GEO insertion tugs, as they could use their large propellant capacities, without having to expend their fuel reserve on launches from the earth.

What is claimed is:

1. A method of space transportation of satellites comprising:

launching multiple space tugs to orbits beyond earth's atmosphere, wherein each of the launched multiple space tugs are nodes of a distributed space transportation network (DSTN), the DSTN comprising:

a flight mission generator configured to determine a flight mission including a selection of one or more space tugs and configured to determine a set of orbital maneuvers for a space tug to rendezvous with a satellite; and a software layer comprising:

a physics layer configured to model and predict behavior of the space tugs;

an assignment layer configured to choose one or more space tugs to transport a satellite; and a maneuver layer configured to compute paths between points in space;

receiving a request to transfer a satellite to a destination in space;

determining paths between the position for each of the multiple space tugs to the satellite;

selecting, by the assignment layer, one or more space tugs to perform the flight mission based on an evaluation of the determined paths and a state of each of the multiple space tugs;

determining, by the maneuver layer, a set of orbital maneuvers;

receiving, by the selected one or more space tugs, the set of orbital maneuvers;

based on the received set of orbital maneuvers by the selected one or more space tugs, maneuvering the selected one or more space tugs to the satellite; and docking the selected one or more space tugs with the satellite.

2. The method of claim 1, further comprising:

determining, by the software layer, the state of each of the multiple space tugs, wherein the state comprises a position, a velocity and propulsion capabilities of a respective space tug.

3. The method of claim 1, further comprising:

determining a rendezvous position for each of the one or more selected space tugs with the satellite.

4. The method of claim 1, wherein the flight mission comprises the selected one or more space tugs of the multiple space tugs, and the set of orbital maneuvers for the selected one or more space tugs to a rendezvous position with the satellite.

5. The method of claim 1, further comprising:

maneuvering the satellite to a destination in space, using the propulsion provided from the selected one or more space tugs docked with the satellite.

6. The method of claim 5, further comprising:

after the satellite is maneuvered to the destination in space, then moving the selected one or more space tugs to a parking orbit.

7. The method of claim 1, wherein a space tug is selected based on an amount of fuel or an amount of time to perform the flight mission.

8. The method of claim 1, further comprising:

determining, by the physics layer, a trajectory of one or more of the space tugs.

9. The method of claim 1, further comprising:

determining, by the maneuver layer, how to move the selected one or more space tugs from one orbit to another orbit.

10. The method of claim 1, wherein selecting the one or more space tugs comprises determining fuel costs from each of the selected one or more space tugs to the satellite and a destination position of the satellite.

11. A distributed space transportation network (DSTN) comprising:

multiple space tugs resident in orbits about the Earth, wherein each of the multiple space tugs are nodes of the (DSTN);

a flight mission generator configured to:

determine a flight mission including a selection of one or more space tugs; and determine a set of orbital maneuvers for a space tug to rendezvous with a satellite; and a software layer comprising:

a physics layer configured to model and predict behavior of the space tugs;

an assignment layer configured to choose one or more space tugs to transport a satellite; and a maneuver layer configured to compute paths between points in space;

wherein upon receiving a request to transfer a satellite to a destination in space, the DSTN is configured to perform the operations of:

determine paths between a position for each of the multiple space tugs to the satellite;

select, by the assignment layer, one or more space tugs to perform the flight mission based on an evaluation of the determined paths and a state of each of the multiple space tugs;

determine, by the maneuver layer, a set of orbital maneuvers for the selected one or more space tugs to rendezvous with the satellite;

receive, by the selected one or more space tugs, the set of orbital maneuvers;

based on the received set of orbital maneuvers by the selected one or more space tugs, maneuver the selected one or more space tugs to the satellite; and dock the selected one or more space tugs with the satellite.

12. The system of claim 11, the DSTN further configured to perform the operations of:

determine, by the software layer, the state of each of the multiple space tugs, wherein the state comprises a position, a velocity and propulsion capabilities of a respective space tug.

13. The system of claim 11, the DSTN further configured to perform the operations of:

determine, by the maneuver layer, a rendezvous position for each of the one or more selected space tugs with the satellite.

14. The system of claim 11, the DSTN further configured to perform the operations of:

determine, by the flight mission generator, a flight mission, the flight mission comprising the selected one or more space tugs of the multiple space tugs, and the set of orbital maneuvers for the selected one or more space tugs to a rendezvous position with the satellite.

15. The system of claim 11, the DSTN further configured to perform the operations of:

maneuver the satellite to a destination in space, using the propulsion provided from the selected one or more space tugs docked with the satellite.

16. The system of claim 15, the DSTN further configured to perform the operations of:

after the satellite is maneuvered to the destination in space, then move the selected one or more space tugs to a parking orbit.

17. The system of claim 11, wherein a space tug is selected based on an amount of fuel or an amount of time to perform the flight mission.

18. The system of claim 11, the DSTN further configured to perform the operations of:

determine, by the physics layer, a trajectory of one or more of the space tugs.

19. The system of claim 11, the DSTN further configured to perform the operations of:

determine, by the maneuver layer, how to move a one or more space tugs from one orbit to another orbit.

20. The system of claim 11, wherein selecting the one or more space tugs comprises determining fuel costs from each of the selected one or more space tugs to the satellite and a destination position of the satellite.

* * * * *